United States Patent [19]

Deweerdt

[11] Patent Number: 4,825,835
[45] Date of Patent: May 2, 1989

[54] FUEL PRESSURE REGULATOR

[75] Inventor: Kevin R. Deweerdt, Livonia, Mich.

[73] Assignee: Sharon Manufacturing Company, Lambertville, Mich.

[21] Appl. No.: 98,985

[22] Filed: Sep. 21, 1987

[51] Int. Cl.[4] .......................................... F02M 39/00
[52] U.S. Cl. .................................. 123/463; 123/456; 123/467; 137/510
[58] Field of Search ............... 123/463, 459, 456, 467, 123/468–470; 251/86, 367; 137/510, 514, 315

[56] References Cited

U.S. PATENT DOCUMENTS

| | | | |
|---|---|---|---|
| 4,205,637 | 6/1980 | Ito | 123/456 |
| 4,284,039 | 8/1981 | Bellicardi | 123/463 |
| 4,500,510 | 11/1981 | Ishida | 123/463 |
| 4,513,725 | 4/1985 | Minami | 123/463 |
| 4,562,816 | 1/1986 | Dorr | 123/456 |
| 4,615,320 | 10/1982 | Fehrenbalh | 123/467 |

Primary Examiner—Carl S. Miller
Attorney, Agent, or Firm—Harold F. Mensing

[57] ABSTRACT

A regulating mechanism for maintaining a preselected pressure within the fuel rail portion of a fuel injection system of an internal combustion engine. The regulator has a cannister with a hollow interior which is divided into a biasing chamber and a fuel chamber by a diaphragm assembly. The diaphragm assembly includes a molded diaphragm having a centrally located socket containing a truncated spherical ball. Centrally disposed coaxial tubular members define concentric fuel inlet and outlet passageways communicating with the interior of the fuel chamber. The inner tubular member defines the fuel outlet passageway and has a valve seat which is normally closed by the truncated surface of the spherical ball, subject to being opened by excessive fuel pressure against the fuel chamber side of the diaphragm.

22 Claims, 2 Drawing Sheets

FUEL PRESSURE REGULATOR

FIELD OF INVENTION

This invention relates to a pressure regulating valve assembly. More specifically it relates to a valve assembly for maintaining the fuel pressure at a preselected maximum level in the fuel rail portion of a fuel injection system of an internal combustion engine.

BACKGROUND OF THE INVENTION

Numerous pressure regulating valve assemblies have been produced in the past but they were generally comprised of a large number of parts that were difficult to assemble. Another problem with the prior art fuel regulators involved connecting them to the appropriate fuel system components. Usually this involved separate flat gaskets, relatively large sealing surfaces and separate fasteners. Accordingly it is an object of this invention to produce a fuel pressure regulator that is comprised of a minimum of parts which are readily mass produced and assembled and to provide such a regulator with a seal means which enables its fuel inlet and outlet passageways to be connected with relative ease to a fuel rail in sealed communication respectively with the interior of the fuel rail and a fuel return line.

SUMMARY OF THE INVENTION

Generally speaking the fuel pressure regulator of this invention comprises a hollow canister with a diaphragm assembly that divides the interior of the canister into a biasing chamber on one side of the diaphragm and a fuel pressure chamber on the other. The diaphragm assembly has a truncated spherical socket in its center for containing a truncated spherical ball. Fuel ingress to the pressure chamber is through an annular entry chamber at the bottom of the pressure chamber and an annular fuel inlet passageway located upstream from the entry chamber. Fuel egress from the pressure chamber is through a coaxially disposed fuel outlet passageway. The coaxial fuel inlet and outlet passageways are defined by concentric inner and outer tubular members. Both tubular members are provided with "O"ring seals on the outside of their outer ends. The fuel outlet passageway, which is defined by the inside of inner tubular member, extends from beyond the distal end of the surrounding outer tubular member into the pressure chamber where it terminates in a flat valve seat that is normally closed by the flat closure portion of the truncated ball. The biasing chamber contains a spring which applies a biasing force to hold the closure ball in sealing contact with the seat normally, subject to being lifted off the seat by an excessive pressure in the pressure chamber. Fuel exits the chamber through the outlet tube while the closure is off the seat and continues to do so until the pressure in the pressure chamber is reduced sufficiently to allow the closure ball to return to its normally closed position. These features and other details and relationships as well as their advantages will be understood best if the following description is read in conjunction with the accompanying drawings.

DETAILED DESCRIPTION OF THE INVENTION

Figure 1:
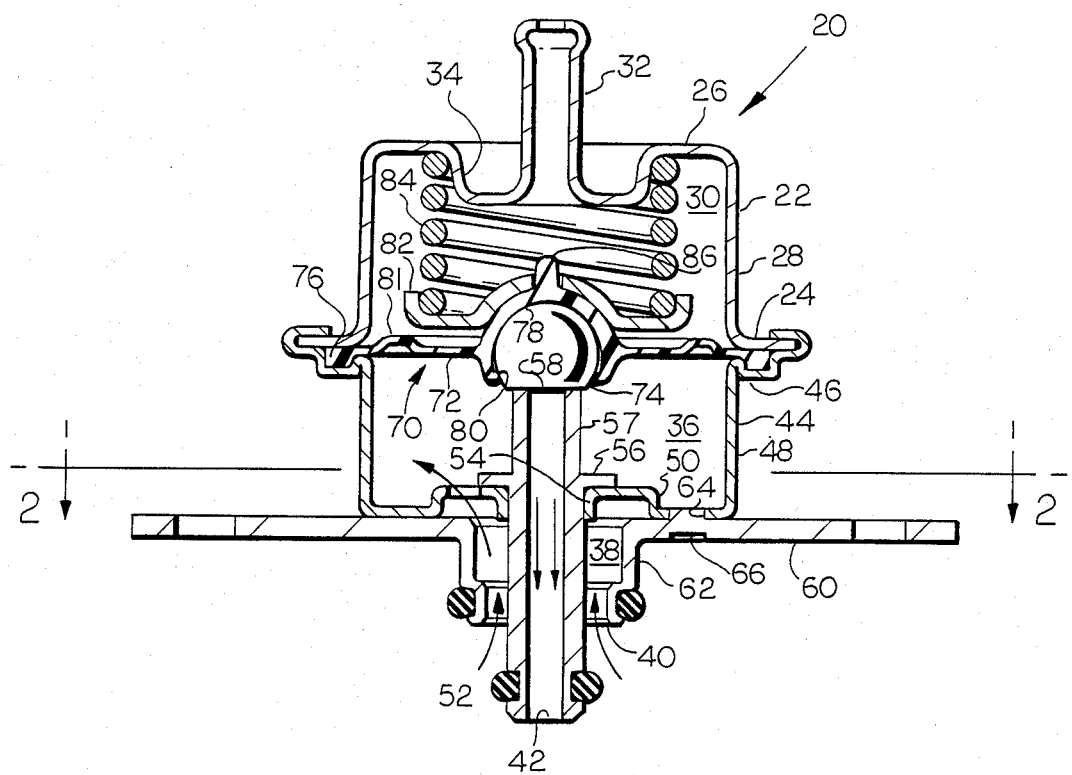
FIG. 1 is a sectional elevation view of one preferred embodiment of the fuel pressure regulator of this invention.
Figure 2:
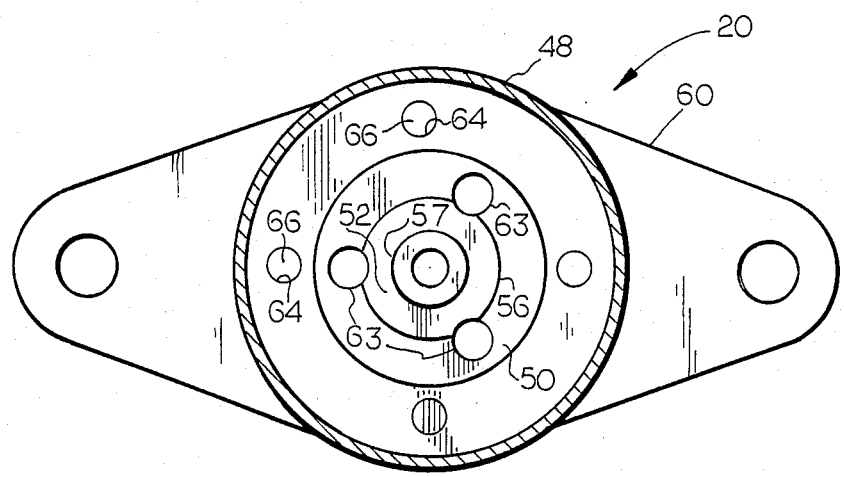
FIG. 2 is a sectional plan view taken along lines 2—2 of FIG. 1.

Referring to FIG. 1 of the drawings it will be noted that the fuel pressure regulator 20 is comprised of a top canister member 22 having an outwardly extending lateral annular flange 24 on its open bottom end, a circular cover member 26 extending across its top end and a cylindrical sidewall 28 extending coaxially from the flange to the perphery of the cover member. This canister member defines the biasing chamber 30. A tubular nipple 32 projects coaxially upwardly from the center of an annular recess 34 formed in the top of the cover member.

The bottom canister assembly is comprised of three components which jointly define a fuel pressure chamber 36, an entry chamber 38 in fluid communication with the pressure chamber and coaxially disposed fuel inlet 40 and outlet 42 passageways. The bottom canister member 44 is similar to the aforementioned top canister member 22 but in reverse. It has a laterally extending annular flange 46 on its open end, a cylindrical sidewall 48 and a circular bottom with a centrally located annular recess 50 protruding upwardly into the pressure chamber 36. However, instead of an integrally attached nipple 32 there is a coaxially disposed downwardly extending tubular fuel return line fitment 52 contained in an extruded aperture in the center of the annular recess 50. The extruded aperture has a short neck 54 which embraces the outside of the fitment and maintains it in coaxial alignment with the other components. Further support for fitment 52 is obtained by means of an annular flange 56 the underside surface of which abuts a corresponding portion of the flat top surface of the annular recess 50. A tubular extension 57 which extends from the flange into the upper half of the pressure chamber has a flat annular valve seat 58 on its terminal end.

The third component of the bottom canister assembly is a mounting plate 60 which has a relatively large circular central aperture with a cylindrical collar 62 that depends from the aperture periphery. Preferably the outside diameter of the collar 62 is less than one-half of the inside diameter of the pressure chamber 36. This component defines the outside of the annular fuel entry chamber. The inside of the entry chamber is defined by the outside of fitment 52 and the adjoining underside surfaces of the annular recess 50. Fluid access to the pressure chamber from the entry chamber is by means of a plurality of apertures 63 arranged in a concentric circle around fitment flange 56 through annular recess 50. With this structural arrangement a lateral vector is imparted to an axially flowing column of incoming fuel causing it to be dispersed. Seal grooves for holding "O" ring type seals are provided on the axially spaced distal ends of collar 62 and fitment 52. In instances where the mounting plate is asymmetrical, such as in the illustrated embodiments, an orientation means, for example, punched holes 64 and bosses 66 may be used.

A diaphragm assembly 70, including a diaphragm member 72 and a valve closure member 74 mounted over the valve seat 58, separates the biasing chamber from the pressure chamber. The diaphragm member is made of a hydrophobic material which is highly flexibe but has limited stretchability. In this embodiment the diaphragm is a one-piece molded plastic member. It has a peripheral bead 76 that is fitted in an annular groove formed in the bottom cannister flange 46. The bead is compressed by the flanges 24,46 during assembly and thereby forms a fluid tight seal between them. Preferably the periphery of each flange extends outwardly beyond the seal bead and the outer edge of one flange is crimped over the outer edge of the other flange, as shown in FIG. 1.

The circular diaphragm 72 has a downwardly open truncated spherical cavity 78 in the center thereof containing the valve closure member 74 which is in the form of a truncated spherical ball of roughly equivalent diameter. Preferably the spherical center of the cavity is above the level where the adjacent portion of the diaphragm merges with the cavity defining portion thereof so that the dome portion which protrudes into the biasing chamber contains more than half of the ball. In the illustrated regulator the depth of the cavity is equal to 70% of its spherical diameter. The skirt portion which protrudes into the pressure chamber may be provided with an annular retention lip 80 on its inside edge. The retention lip at the mouth of the cavity reduces the normal diameter of the opening by 0.04 of an inch to provide an interference fit with the ball, such that the grip on the ball is sufficient to prevent rotation of the ball in the cavity during normal operation but allows it to be oriented initially so that the flat sealing face of the ball is in parallel contact with the flat face of the seat. To improve its effectiveness the diaphragm is provided with a concentric annular undulation 81 in the flexing portion between the peripheral bead and the socket.

A circular spring plate 82 having a central dome conforming to the shape of the outer top surface of the socket is held in contact therewith by means of an axially aligned helical compression spring 84 extending between the cap and the cover of the top cannister member. Axial alignment of the plate on the socket dome is achieved by means of an axial peg 86 formed on the top of the socket dome and a corresponding hole in the center of the cap 82. Axial alignment of the spring 84 is achieved by sizing the outside of the annular recess in the top canister cover to snugly fit into the inside top of the spring and by providing an upturned rim on the spring plate to snugly engage the outside of the lower end of the spring.

Figure 3:
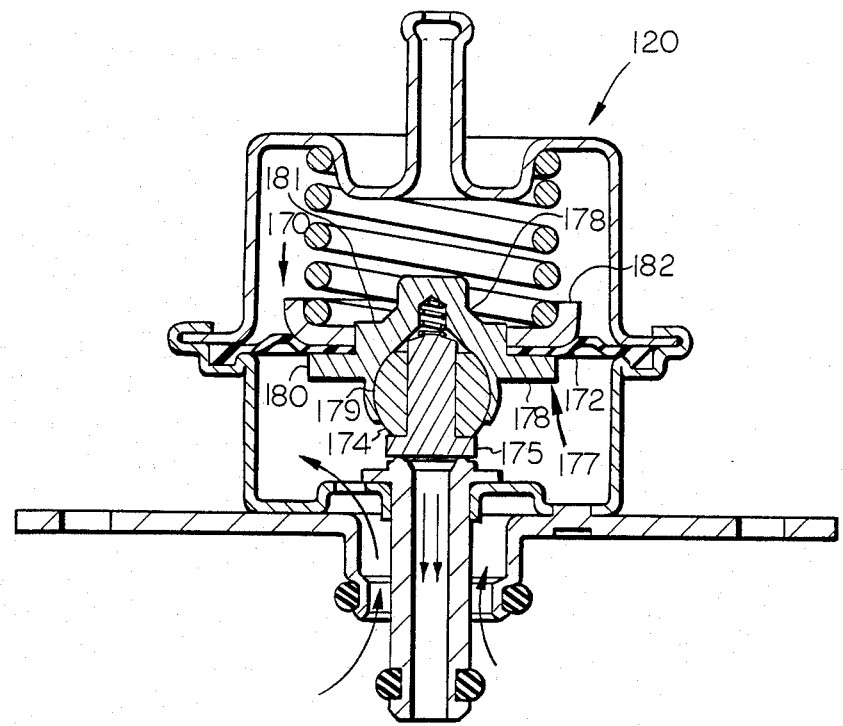
FIG. 3 is a sectional elevation view of another fuel pressure regulator embodiment.

The fuel pressure regulator 120 illustrated in FIG. 3 is identical to the previously described regulator 20 with the exception of the diaphragm assembly, the spring plate and the distance valve seat protrudes into the pressure chamber. The diaphragm assembly 170 of this latter embodiment 120 has a separate socket assembly 177 which is affixed in an aperture in the center of the diaphragm member 172. Socket assembly 177 comprises a socket member 178, a ball member 174 in the socket and a valve closure member 175 inserted in a bore extending axially through the center of the ball. The socket member 178 has a thin walled annular skirt 179 at its open end followed on the inside by a conical intermediate bore section and a small diameter spring bore at its closed top end. An annular flange 180 extends outwardly from the top of the skirt followed by an upwardly projecting circular shoulder 181 that extends through coaxially aligned apertures in the diaphragm and the biasing spring plate. The inner edge of the diaphragm is tightly held between opposing annular surfaces of the spring plate and the flange. The lower portion of the skirt is swaged around the adjacent portion of the ball to retain it in position in the socket. A small helical spring contained in the spring bore exerts a downward pressure against the top of the valve closure member to resist rotation of the ball in the socket.

While the fuel pressure regulator disclosed herein has been described and illustrated with respect to two specific embodiments, it is to be understood that modifications could be made to them without departing from the scope of the invention which is defined primarily by the appended claims.

What is claimed is:

1. An improved fuel pressure regulator for a fuel injection system of an internal combustion engine, said regulator comprising: a canister, a diaphragm assembly separating the interior of the canister into a biasing chamber and a fuel pressure chamber, said diaphragm assembly includes a molded diaphragm member having a diaphragm portion surrounding an integrally attached central ball socket portion, and a valve closure ball member movably secured in said socket portion, said socket portion has an annular skirt which extends into said pressure chamber and defines a flexible circular opening with a relatively smaller diameter through which a relatively larger diameter portion of said closure ball member has been inserted, a closure surface on said ball, tubular members defining inlet and outlet fuel passageways communicating with said pressure chamber, said outlet passageway defining tubular member extends into said pressure chamber and has a valve seat on its internal end, and means for normally holding said closure surface in contact with said seat.

2. A regulator according to claim 1 wherein said skirt has an annular retention lip on its inside bottom edge.

3. A regulator according to claim 1 wherein said socket portion has a closed dome portion which extends into said biasing chamber and has a peg extending axially from its outer surface.

4. A regulator according to claim 3 wherein said biasing chamber contains a spring plate having a dome section the inside surface of which conforms to the outside shape of said socket dome portion, said dome surface being in frictional engagement with said dome portion and centered thereon by means of a central aperture fitted on said peg, and a helical biasing spring extending from said plate to the opposite end of said biasing chamber.

5. A regulator according to claim 1 wherein said socket portion defines a truncated spherical cavity and said ball is a truncated spherical ball with a flat closure surface.

6. A regulator according to claim 1 wherein said tubular members are coaxially disposed relative to each other, the inside of the inner tubular member defines said outlet fuel passageway, and said inlet passageway is an annular passageway defined by the outside of the inner tubular member and the inside of the outer tubular member.

7. A regulator according to claim 6 wherein the distal end of the inner tubular member extends outwardly beyond the distal end of the surrounding outer tubular member, and said distal ends have seal grooves on the outside thereof.

8. A regulator according to claim 6 wherein said regulator further includes an appended fuel entry chamber defined in part by a portion of the canister which defines the bottom of the pressure chamber and in part by adjacent portions of said tubular members.

9. A regulator according to claim 8 wherein said inlet passageway communicates with said pressure chamber through a plurality of apertures in the bottom of said canister by way of said entry chamber.

10. A regulator according to claim 9 wherein the exit end of said annular entry chamber is enlarged and the entry chamber defining portion of the bottom of the canister is recessed.

11. A regulator according to claim 10 wherein the portion of said outer tubular member defining said enlarged portion of said entry chamber is a lateral flange on the top of said tubular member.

12. An improved fuel pressure regulator for a fuel injection system of an internal combustion engine, said regulator comprising: a canister having a top shell member with an open bottom end and an outwardly extending lateral flange on said bottom end, a bottom shell member with an open top end and an outwardly extending lateral flange on said open top end, a diaphragm assembly separating the interior of the canister into a biasing chamber and a fuel pressure chamber, said diaphragm assembly includes a one piece circular diaphragm member having a diaphragm portion surrounding a flexible central ball socket portion, and a valve closure ball member movably secured in said socket, said diaphragm portion having an annular undulation disposed concentrically between said socket portion and the periphery of said diaphragm portion, said socket portion has an annular skirt which extends into said pressure chamber and defines a flexible circular opening with a relatively smaller diameter through which a relatively larger diameter portion of said closure ball member has been inserted, a closure surface on said ball, tubular members defining inlet and outlet fuel passageways communicating with said pressure chamber, said outlet passageway defining tubular member extends into said pressure chamber and has a valve seat on its internal end, and means for normally holding said closure surface in contact with said seat.

13. A regulator according to claim 12 wherein said skirt has an annular retention lip on its inside bottom edge.

14. A regulator according to claim 12 wherein said socket portion has a closed dome portion which extends into said biasing chamber and has a peg extending axially from its outer surface.

15. A regulator according to claim 14 wherein said biasing chamber contains a spring plate having a dome section the inside surface of which conforms to the outside shape of said socket dome portion, said dome surface being in frictional engagement with said dome portion and centered thereon by means of a central aperture fitted on said peg, and a helical biasing spring extending from said plate to the opposite end of said biasing chamber.

16. A regulator according to claim 12 wherein said socket portion defines a truncated spherical cavity and said ball is a truncated spherical ball with a flat closure surface.

17. A regulator according to claim 12 wherein said tubular members are coaxially disposed relative to each other, the inside of the inner tubular member defines said outlet fuel passageway, and said inlet passageway is an annular passageway defined by the outside of the inner tubular member and the inside of the outer tubular member.

18. A regulator according to claim 17 wherein the distal end of the inner tubular member extends outwardly beyond the distal end of the surrounding outer tubular member, and said distal ends have seal grooves on the outside thereof.

19. A regulator according to claim 17 wherein said regulator further includes an appended fuel entry chamber defined in part by a portion of the canister which defines the bottom of the pressure chamber and in part by adjacent portions of said tubular members.

20. A regulator according to claim 19 wherein said inlet passageway communicates with said pressure chamber through a plurality of apertures in the bottom of said canister by way of said entry chamber.

21. A regulator according to claim 20 wherein the exit end of said annular entry chamber is enlarged and the entry chamber defining portion of the bottom of the canister is recessed.

22. A regulator according to claim 21 wherein the portion of said outer tubular member defining said enlarged portion of said entry chamber is a lateral flange on the top of said tubular member.

* * * * *